United States Patent
Terlecki et al.

(10) Patent No.: US 12,536,145 B2
(45) Date of Patent: Jan. 27, 2026

(54) SYSTEMS AND METHODS FOR COLUMN STORE INDICES

(71) Applicant: MongoDB, Inc., New York, NY (US)

(72) Inventors: Pawel Terlecki, Miami, FL (US); Mathias Benjamin Stearn, Copenhagen (DK); Martin Neupauer, New York, NY (US); Charles William Swanson, Rochester, NY (US); Ian Boros, New York, NY (US)

(73) Assignee: MongoDB, Inc., New York, NY (US)

(*) Notice: Subject to any disclaimer, the term of this patent is extended or adjusted under 35 U.S.C. 154(b) by 22 days.

(21) Appl. No.: 18/329,106

(22) Filed: Jun. 5, 2023

(65) Prior Publication Data

US 2023/0394017 A1    Dec. 7, 2023

Related U.S. Application Data

(60) Provisional application No. 63/349,524, filed on Jun. 6, 2022.

(51) Int. Cl.
*G06F 16/22* (2019.01)
(52) U.S. Cl.
CPC .................................. *G06F 16/221* (2019.01)
(58) Field of Classification Search
CPC ...................................................... G06F 16/221
USPC .......................................................... 707/744
See application file for complete search history.

(56) References Cited

U.S. PATENT DOCUMENTS

| | | | | |
|---|---|---|---|---|
| 8,862,625 | B2* | 10/2014 | Meiyyappan | G06F 16/2453 |
| | | | | 707/791 |
| 10,762,068 | B2* | 9/2020 | Legler | G06F 16/2255 |
| 11,429,629 | B1* | 8/2022 | Pedapati | G06F 16/248 |
| 11,500,839 | B1* | 11/2022 | Pedapati | G06F 16/2282 |
| 11,514,236 | B1* | 11/2022 | Pedapati | G06F 16/221 |
| 11,768,818 | B1* | 9/2023 | Pedapati | G06F 16/2228 |
| | | | | 707/741 |
| 2011/0219020 | A1* | 9/2011 | Oks | G06F 16/2228 |
| | | | | 707/769 |
| 2014/0304219 | A1* | 10/2014 | Yoon | G06F 16/221 |
| | | | | 707/607 |
| 2019/0179948 | A1* | 6/2019 | Benjamin-Deckert | |
| | | | | G06F 16/2453 |
| 2020/0320091 | A1* | 10/2020 | Wu | G06F 16/21 |
| 2023/0394017 | A1* | 12/2023 | Terlecki | G06F 16/221 |
| 2024/0020303 | A1* | 1/2024 | Tummala | G06F 16/221 |
| 2024/0184793 | A1* | 6/2024 | Amulu | G06F 16/2465 |

* cited by examiner

*Primary Examiner* — Joshua Bullock
(74) *Attorney, Agent, or Firm* — Wolf, Greenfield & Sacks, P.C.

(57) ABSTRACT

A database system comprising a database having a dynamic schema and at least one processor configured to: generate at least one column store index associated with the database, at least by: extracting keys from at least one document in the database, and sorting the keys; store the at least one column store index at least by storing the keys in the database; and access the at least one column store index based on at least one access request.

19 Claims, 8 Drawing Sheets

Row Store

| RowId | Data |
|---|---|
| 1 | { a: "A1", b: ["B1_1", "B1_2"] } |
| 2 | { a: "A2", b: ["B2_1", "B2_2"] } |

Column Store

Column a

| RowId | Data |
|---|---|
| 1 | "A1" |
| 2 | "A2" |

Column b

| RowId | Data |
|---|---|
| 1 | "B1_1", "B1_2" |
| 2 | "B2_1", "B2_2" |

FIG. 3

SYSTEMS AND METHODS FOR COLUMN STORE INDICES

RELATED APPLICATIONS

This application claims priority under 35 U.S.C. § 119(e) to U.S. Provisional Application Ser. No. 63/349,524, entitled "SYSTEMS AND METHODS FOR COLUMN STORE INDICES," filed on Jun. 6, 2022, which is herein incorporated by reference in its entirety.

BACKGROUND

Dynamic schema and/or unstructured datasets permit flexibility in data organization and architecture which provides advantage in terms of adaptability and compatibility with various data environments. This is unlike known relational or static data schema databases, where there can be no or limited constraints on data format.

SUMMARY

Some embodiments are directed to techniques for generating, storing, and accessing column store indices.

Some embodiments are directed to a database system comprising a database having a dynamic schema and at least one processor configured to: generate at least one column store index associated with the database, at least by: extracting keys from at least one document in the database, and sorting the keys; and store the at least one column store index at least by storing the keys in the database.

Some embodiments are directed to a computer implemented method comprising: generating at least one column store index associated with the database, at least by: extracting keys from at least one document in the database, and sorting the keys; and storing the at least one column store index at least by storing the keys in the database.

Some embodiments are directed to at least one computer-readable storage medium having instructions recorded thereon which, when executed by a computer, cause the computer to perform a method. The method may comprise: generating at least one column store index associated with the database, at least by: extracting keys from at least one document in the database, and sorting the keys; and storing the at least one column store index at least by storing the keys in the database.

BRIEF DESCRIPTION OF THE DRAWINGS

Various aspects of at least one embodiment are discussed herein with reference to the accompanying figures, which are not intended to be drawn to scale. The figures are included to provide illustration and a further understanding of the various aspects and embodiments, and are incorporated in and constitute a part of this specification, but are not intended as a definition of the limits of aspects herein. Where technical features in the figures, detailed description or any claim are followed by references signs, the reference signs have been included for the sole purpose of increasing the intelligibility of the figures, detailed description, and/or claims. Accordingly, neither the reference signs nor their absence are intended to have any limiting effect on the scope of any claim elements. In the figures, each identical or nearly identical component that is illustrated in various figures is represented by a like numeral. For purposes of clarity, not every component may be labeled in every figure. In the figures:

FIG. 3 is a table representation of exemplary row store and column store formats, according to some embodiments.

Figure 1:
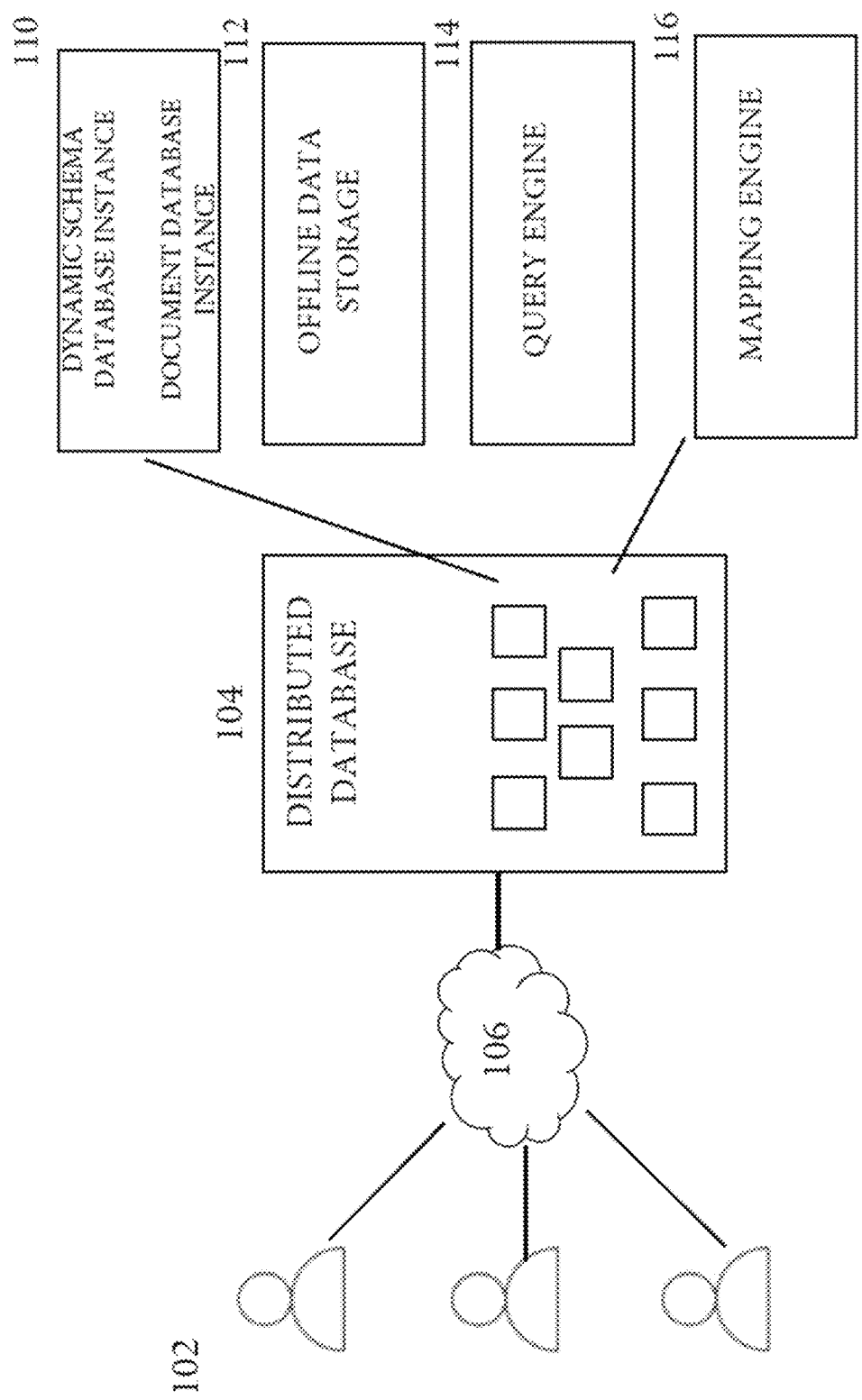
FIG. 1 is a block diagram of an example system with a distributed database, according to some embodiments.

Those skilled in the art will appreciate that the logic and process steps illustrated in the various flow diagrams discussed below may be altered in a variety of ways. For example, the order of the logic may be rearranged, sub-steps may be performed in parallel, illustrated logic may be omitted, other logic may be included, etc. One will recognize that certain steps may be consolidated into a single step and that actions represented by a single step may be alternatively represented as a collection of sub-steps. The figures are designed to make the disclosed concepts more comprehensible to a human reader. Those skilled in the art will appreciate that actual data structures used to store this information may differ from the figures and/or tables shown, in that they, for example, may be organized in a different manner; may contain more or less information than shown; may be compressed, scrambled and/or encrypted; etc.

DETAILED DESCRIPTION

Various example embodiments will now be described. The following description provides certain specific details for a thorough understanding and enabling description of these examples. One skilled in the relevant technology will understand, however, that some of the disclosed embodiments may be practiced without many of these details.

Likewise, one skilled in the relevant technology will also understand that some of the embodiments may include many other obvious features not described in detail herein. Additionally, some well-known structures or functions may not be shown or described in detail below, to avoid unnecessarily obscuring the relevant descriptions of the various examples.

The terminology used below is to be interpreted in its broadest reasonable manner, even though it is being used in conjunction with a detailed description of certain specific examples of the embodiments. Indeed, certain terms may even be emphasized below; however, any terminology intended to be interpreted in any restricted manner will be overtly and specifically defined herein.

In some embodiments, a "column store" index type may be used in a database and may be suited for analytical queries. For example, users can use such an index type to speed up many common analytical queries, without deep knowledge of their data or queries.

In some embodiments, the inventors have recognized that looking through all the data in a large database can take significant time. For example, a user may want to go through an entire database and see with how many objects something (for an example used herein, an author) is associated. Instead of storing every object in one place, some embodiments store one with all the authors, one with all the titles, and one with all contents, which the inventors have recognized is faster to read, especially to perform analytics over the data set (e.g., obtain totals, like total times an author occurs). The inventors have recognized this can be especially helpful for MongoDB databases, which can make the objects larger due to the unstructured schema.

The inventors have recognized that there may be need to reassemble a nesting structure for each document. In some embodiments, an encoding scheme is used to reassemble a nesting structure.

In some embodiments, an existing data structure to store the column store data may be used. For example, B-Trees may be used to store the column store data.

The inventors have recognized that organizing the key into column name and record identifier may provide good prefix compression and properties to the column store.

In some embodiments, relational functionality may be translated into non-relational functionality so users can get the same functionality with the benefits of an unstructured database.

The inventors have recognized that query semantics are such that arrays are traversed unless directly nested in another array. Accordingly, some embodiments may detect if within that state (e.g., check for double-nested array). In some embodiments, this works directly off the encoding without having to re-materialize the data.

The inventors have recognized that figuring out what parts of a query can be applied directly to the stream of data without re-materializing can be valuable. Some embodiments may apply queries directly against a data stream. For example, a technique like zig-zag search may be used.

In some embodiments, numerous operations (beyond equality) may be supported by zig-zag search or scan.

In some embodiments, bucket sorting may be used. The inventors have recognized that a way to speed up building an index includes sorting data to store in the index. Because billions of entries may be stored in the index, that is expensive computationally, and bucket sorting may be used to group all the entries for each path/column, at which point the column names (e.g., for 200 columns) can be sorted so data is already in the order needed. The inventors recognized that bucket sorting can provide significant improvement as it avoids sorting far more data than the column names. In some embodiments, this can also be used in a sorting pipeline (e.g., if there is too much data in memory, processes can sort some data in memory, save to disk, sort more in memory, save to disk, etc.).

In some embodiments, when building an index, the rough pipeline of events may be as follows: extract keys from each document, sort keys, then write these into database. In some embodiments, sorting is done so that the data storage layer is much more efficient. In some embodiments, queries can be performed using less storage input/output than is conventionally possible.

In some embodiments, an external sorter is used to deal with memory limits. The inventors have recognized that in-memory sorting can be particular valuable. With lots of data in memory, with many millions of keys, if you sort all the keys, it takes a certain time. Because data is pre-sorted on a dimension but not sorted by column, everything can be stored in buckets based on the column names. In some embodiments, there is no need to sort within a column, but there is a need to sort the columns. In some embodiments, the process of building the index is then 2-4 times faster for in-memory sorting.

In some embodiments, bulk inserts may be used. For example, for a first object, a title, then author, then body could be entered, whereas the inventors recognized it is much faster to put in all authors for objects 1, 2, and 3, titles for each, etc.

In some embodiments, a combination of Prefix Compression may be used with keys organized into column based on a big-endian record ID. The inventors have recognized that it is not intuitive that this behavior would arise. In some embodiments, this prefix compression allows use of off the shelf (e.g., no modifications to WiredTiger) data storage—without need for column store logic in a low level storage layer. In some embodiments, this prefix compression gives effectively the same characteristics of column store without needing to do it.

In some embodiments, by default, the column store only indicates where data is, not where data is not. The inventors have recognized that semantics are such that it is invisible where data is not present.

In some embodiments, when storing authors, their names may be split up between first, middle, and last name. If grouping by first name, parts of the system will behave differently for authors that have no first name. The most direct way to store the data does not distinguish those two cases. Some embodiments preserve the efficiency while still maintaining that difference. In some embodiments, this can be done as a combination. For example, when the data is stored, processing to detect local sparseness may be performed—along every path through a parent, processing may end up at a child in the columnar hierarchy. If there are paths where that field is not encountered, a flag may be stored indicating local sparseness. That makes the system consult the parent path to get structural information from the parent path. That may be followed until there is no local sparseness flag. In some embodiments, a path can be locally sparse when there is an array along the path.

The inventors have recognized that it matters how children are not present. Some embodiments only cover the case where some authors have a first name and some do not. In a case where none of the authors have a first name, or you have no authors, or no information about authors, then there may be no entry for Authors.FirstName for that book. In some embodiments, no data is recorded where it does not exist, so there is a need to check parent paths to check for sparseness. In some embodiments, any time there is a lack of information, it is treated as being sparse.

In some embodiments, column store storage/indexing allows for faster aggregations, typical of analytical queries. The inventors have recognized and appreciated that column store may improve compression and efficient execution of expressions over compressed data, and that an analytical query most often references just a few fields with a large number of items that need to be sequentially read, which allows for dramatically more economical input/output management.

The inventors have recognized and appreciated that conventional performance (e.g., with MongoDB) on analytical queries and SQL support have been sub-par, causing customers to rely on change streams, CDC, or ETL tools to replicate data to solutions ranging from relational databases to data warehouses for their analytical processing. The inventors have recognized and appreciated that a column store index can improve analytical query performance on application/operational data (e.g., changing data) without having to remodel data or export data to an external system. The inventors have recognized and appreciated that some embodiments simplify application architecture and provide sub-second queries on fresh data.

In some embodiments, document-based collections with B-Tree indices ensure fast writes and point or selective range reads. The inventors have recognized and appreciated that these are efficient for transactional and search scenarios that process entire documents. On the other hand, analytical queries usually reference a handful of fields each and perform well against column-oriented formats. In this case, fields are highly-compressed and can be loaded selectively, providing dramatic savings in input/output costs. In some embodiments, the storage cache is utilized more efficiently, as it focuses on the set of most common fields in a workload. In some embodiments, other techniques, such as skip-scans or operations on compressed data can additionally improve read performance.

The inventors have recognized and appreciated that allowing users to supplement their collections with column store indices is a seamless way of adding support for analytical workloads to their systems, trading off storage and write throughput. In addition, some embodiments can improve performance not only for a known upfront fixed workload but also for ad hoc queries.

The inventors have recognized and appreciated that columnar storage is a foundation of self-service analytical systems. For example, it allows for efficient processing of workloads of wide complexity without the burden of analyzing individual queries and creating matching secondary structures. The inventors have recognized and appreciated this is critical for both ad hoc scenarios, such as data exploration or dashboard authoring, and for diverse fixed workloads often full of complicated queries.

The inventors have recognized and appreciated that columnar storage may be applied to accelerate analytical queries over document-based collections. In some embodiments, users will be able to achieve orders of magnitude higher read performance simply by supplementing a collection with a column store index. While the associated maintenance cost is noticeable in some embodiments, this may be alleviated by not defining a number of otherwise necessary B-Tree search indices. Also, the additional storage expense may be limited due to the high compression rates of the columnar format in some embodiments.

The inventors have recognized and appreciated that self-service is also important, as users need a good understanding of their data and workloads in order to achieve high query performance. Thus, choosing appropriate search indices, and materialized views in the future, is somewhat alleviated by system analysis tools, such as Performance Advisors.

The inventors have recognized and appreciated that a column store index is an important missing feature in conventional system, along with LSM-trees, a better optimizer, and a vectorized execution engine.

Since many documents have polymorphic types and nested objects and arrays, the inventors recognized and appreciated the importance to expressing flexible schemas in a columnar fashion of how to map fields to columns.

The inventors have recognized and appreciated that time-series collections and ADL storage format optimize for large volumes of data ingested at often high rates and mostly remaining cold afterwards. In some embodiments, documents of similar schemas are grouped together and stored in separate segments (cloud objects or buckets). In some embodiments, each document is shredded into field-value pairs and stored in columns, which can allow for extremely high columnar compression and relatively high ingestion throughput. In some embodiments, indices can further speed up data access. In some embodiments, time-series collections only shred top-level fields.

While the conventional segmented-storage approach greatly improves query performance, the inventors have recognized and appreciated this approach has several drawbacks.

For example, analytical queries generally reference just a few fields each. In case of time-series collections, the inventors have recognized and appreciated that loading an entire bucket instead of just the corresponding columns can be wasteful. Moreover, because an entire workload commonly focuses around a relatively small set of fields, the storage engine cache stores much unnecessary data. The inventors have recognized and appreciated that wider schemas are not handled well.

As another example, it may not be clear how to cluster the documents, so the user may need to indicate discriminating fields. This works well for collections representing a hierarchy of classes but worse for the scenarios of custom tagging or schema evolution/variation.

Additionally, updating documents in place is a heavy operation, as it requires uncompressing and rebuilding a segment.

As a further example, an existing row-oriented collection needs to be converted to the segmented columnar format in order to enable faster query performance.

In order to address these drawbacks, some embodiments use a columnar or column store format.

Some embodiments are illustrated in the figures. For example, FIG. 1 is a block diagram of an example system with a distributed database, according to some embodiments. Shown at 102, database clients and/or users can access a dynamic schema database 104 via a network 106. Users can submit queries that are executed by the database 104. In various embodiments, the database system can include a query engine configured to accept and process user queries and return data output via network 104. In some embodiments, the database 104 includes data under a dynamic or unstructured schema. Dynamic and/or unstructured databases do not enforce any data type limitations and can store structured and unstructured data. According to one embodiment, the known MongoDB database is an example of a dynamic and/or unstructured database. In MongoDB, data assets or base units of data are stored as BSON formatted documents. BSON are a binary serialization of java script object notation documents and store and transmit data objects consisting of attribute—value pairs, arrays (or other serializable values), and/or embedded documents.

For example, the database 104 can include a collection (e.g., a named logical grouping) of document data stored under a dynamic schema model at 110. The database 104 can also include other storage architectures and database instances (e.g., 112 offline storage or data lake storage). In various embodiments, the database includes a query engine 114 for processing any user queries and returning the results of the user queries. In some embodiments, the query engine is configured to execute an aggregation pipeline to process a user query on dynamic schema data. The known MongoDB database provides for aggregation operations that handle expressive queries efficiently on dynamic or unstructured data, as well as integrate with offline storage options. According to one embodiment, the database 104 can include an aggregation framework for processing queries according to a plurality of execution stages. MongoDB employs operators and execution of aggregations like $match, $unwind, $project, etc., to ensure efficient output from querying dynamic or unstructured data. Further embodiments introduce a $sql stage/aggregation operation to the aggregation framework to accept and interpret structured language queries to be executed on structured, dynamic, or unstructured data. In one example, the system and/or query engine 114 can include a mapping engine 116 configured to map incoming structured language queries into native operations that can leverage the full functionality of any underlying database implementation (e.g., MongoDB). In other embodiments, the mapping engine and/or query engine is configured to translate structured query statements into data environments and binding values that correspond to the structured queries. The definition of the operation's environment and corresponding binding values enables the query engine to accurately and consistently capture structured, non-structured and/or dynamic schema data without ambiguity or error.

In various embodiments, the query engine 114 and/or mapping engine 116 can be configured to identify structured query language query elements and manage their execution, for example, as part of a structured query language execution stage. In one example, the system is configured to accept queries from users who specify queries and/or portions of queries using specific query notation (e.g., $sql follow by query parameters). The query engine 114 and/or mapping engine can be configured to manage execution of the structured query language portion of the query and pass any output, to the user in response to the query or to another processing stage that employs the output of the prior stage for further processing. Similarly, the query engine 114 can be configured to execute other aggregation stages and pass their output to a $sql stage for further processing.

According to some embodiments, the query engine 114 and/or mapping engine 116 can be configured to process query functions in a $sql stage. The query engine 114 and/or mapping engine 116 can include processing rules and/or functions detailed in a query dialect configured to process structured query language, and may include mapping the structured query language into native expressive functions. In some embodiments, the mapping engine 116 can be called by the query engine as part of execution of an aggregation pipeline and/or stage. In other embodiments, the mapping engine can be a component or sub-component of the query engine, and in still others, the query engine can execute the functions described with respect to the mapping engine.

The inventors have recognized and appreciated that analytics (or OLAP, Online Analytical Processing) workloads differ from transactional (OLTP) workloads in that they often access only a few fields/columns but large numbers of rows/documents. For example, a user is often interested in aggregated results (counts, averages, min/max, etc.) rather than individual values. Analytical workloads are primarily read-only, however, results can be written back to persistent storage (e.g., materialized views, data sketches, etc.) as part of certain workflows.

Analytics is typically associated with traditional data warehousing, where data is often loaded into a system in batches and queries can tolerate longer wait times (minutes to hours). Those queries are also usually known in advance since they typically serve BI reporting scenarios. The inventors have recognized and appreciated that column store indexing does not directly solve the broad-based/data warehousing analytics use case.

The inventors have recognized and appreciated that column store indexing may be beneficial in at least the following situations: customers that export data from MongoDB to other databases to perform interactive analytical queries; customers that would benefit from an improvement in performance; and applications with embedded charts (MongoDB Charts or otherwise) that offer interactive analytics experience with sub-60-second data freshness.

In some embodiments, users can create/drop/discover indices of the new "column store" type.

In some embodiments, the user experience makes it easier to index all fields while also allowing users to target or exclude specific fields to tune for performance or storage space.

In some embodiments, while analytical queries automatically utilize the column store index and can target analytics nodes, users can also provide query hints for column store index utilization. In some embodiments, hints allow using column store indices with any query (e.g., use a column store index if no B+ tree index exists for that field).

In some embodiments, users can rely on column store indices to speed up interactive visualizations through BIC or in MongoDB Charts operating over large datasets.

In some embodiments, price-performance wise, using the new column store index is no worse than existing customer workarounds like maintaining an extra copy of the data in another database (e.g., adding an analytics node or vertically scaling to accommodate column store index). In some embodiments, adding a single node (e.g., Atlas node) is cheaper than adding a Amazon RDS Postgres instance. The inventors have recognized and appreciated that in cases where decent analytical query performance can be achieved without needing additional nodes, this advantage would be further emphasized.

Some embodiments may scale vertically, with replicas that are used just for analytical queries or both.

Some embodiments may rely on column store indices when building Parquet files.

In some embodiments, users can choose to have column store indices only on analytical nodes and opt out of analytical nodes inheriting certain B+-Tree indices from operational nodes.

Some embodiments may use parallel scans for column store index.

In some embodiments, a query optimizer may leverage the column store index beyond basic heuristics.

In some embodiments, when query engine implements Inner and right outer joins, hash, merge and cross-database joins column store indices can be used in such joins.

In some embodiments, median-percentile accumulators are supported with column store.

In some embodiments, performance may be as good as conventional column store engines.

Some embodiments may catalog and implement targeted query optimizations for common query patterns among customers.

In some embodiments, analytical queries targeting the column store index can take advantage of the query results cache.

Some embodiments provide Index Advisor support.

In some embodiments, users can create column store indices for data loaded/unarchived from ADL to support low latency interactive visualizations (e.g., to improve the performance of their Looker dashboards).

Some embodiments may provide partial column store indices and an ability to expire column store indices (e.g., only keep recent data in column store index with historical data kept in pre-aggregated form while keeping raw data and B+ tree indices for row level access).

Some embodiments may use tunable storage (e.g., heavily compressed, custom partitioned/sorted, lazily updated clustered index for infrequently updated data to make it possible to keep even larger indices entirely in memory for further improved read performance or lower cost archival vs less compressed, unsorted for faster updates).

Some embodiments allow users to define a single column store index for a given document collection. For example, a subschema to be indexed can be specified in a similar fashion as wildcard indices.

Some embodiments ensure a column store index is stored in an economical manner (e.g., in WildTiger tables). The inventors have recognized and appreciated that this may benefit from appropriate compression features.

In some embodiments, a columnar index must contain enough information to reconstruct the complete collection modulo document field order. In some embodiments, nesting structure and array element order is encoded.

Some embodiments expose tuning of block compression to the user to allow for trading off speed for storage/input-output.

Some embodiments ensure a column store index is strongly consistent with its corresponding collection and maintained synchronously.

Some embodiments extend the query optimizer to use a column store index under a fairly conservative heuristics (e.g., a query is fully covered, the set of referenced fields is relatively small, and no regular indices can be used instead). Some embodiments use conservative heuristics to target queries with exact match predicates. For example, a user can seek into a regular index and fetch few fields from a column store index over the same collection.

Some embodiments add support for accessing data from column store indices in Slot-based Execution. For example, some embodiments may push down predicates to the columnar scan to avoid scanning all values for documents that are already eliminated.

Some embodiments add details about scanning column store indices into the explain output and log lines so that queries using column store indices can be explicitly identified by their log line.

Some embodiments add details about column store indices to $indexStats.

Some embodiments add correctness tests to ensure the same results between plans using a collection scan and plans involving column store indices. In some embodiments, this may require addressing potential semantic differences in corner cases.

Some embodiments allow scanning column store indices to be leveraged with a hint. For example, this may include queries without any projection or known dependencies like find({x:1}).hint("column store") (where the column store may not be used without the hint because all matching results may need to be fetched from the row store).

Some embodiments may use an existing index infrastructure including: index manipulation (createIndex, dropIndex, etc.); entry in listIndexes; sharding (which may not mean a columnar index can be used as the shard key index); hiding indices; changestreams DDL; and/or C2C.

Some embodiments support column store indices over clustered and time-series collections. Some embodiments support column store indices in the classic execution engine. Some embodiments support uniqueness for column store indices. Some embodiments support partial column store indices. Some embodiments support TTL column store indices. Some embodiments support storing additional information with every indexed value (e.g., to partition a column store index across tenants).

Some embodiments ensure identical results for queries with respect to field ordering in objects between collections, scans, and plans referencing column store indices.

Some embodiments implement asynchronous updates/deletes.

Some embodiments enforce any rules or behaviors around document field order for plans using column store indices.

Some embodiments support for queries that have MatchExpressions involving numeric components (e.g., db.c.find({"address.0.foo": {$eq: . . . }})).

Some embodiments may support changing keys in an index definition, so that a user does not have to rebuild an entire index.

In some embodiments, two syntax options—create a column store index on one field (and all subfields)) and create a column store index on multiple specific fields via projection—may mirror those used to create wildcard indices and allow for future extensions such as compound or partial column store indices.

Some embodiments may include or exclude subschemas schema. In some embodiments, one cannot combine inclusion and exclusion statements, and so the <value> can be either: 1 or true to include the field and recursively all fields it is a prefix of in the index; or 0 or false to exclude the field and recursively all fields it is a prefix of from the index.

In some embodiments, cloud implementations (e.g., Atlas) may support column store indices. For example, Cloud Intel's Data Explorer may ensure column store indices can be defined within createIndex flow and user interface ("UI") in Atlas Data Explorer. In some embodiments, no work is required as Atlas Data Explorer passes the createIndex command down. However, testing may be required to ensure there are no potential parsing changes needed due to slight differences in syntax proposed above.

In some embodiments, any illegal column store index definition passed to the createIndex API may silently fail and no error message may be surfaced to the user in the UI.

In some embodiments, column store index support may be provided for the index screen to label/tag column store indices as "column store" per their "type" association. Logic/mapping will need to be added to the index mapping (e.g., within Data Explorer) to define a "column store" index type given its listIndexes( ) output. In some embodiments, if the API returns an error and Data Explorer would have surfaced an error from the same command were it for a traditional index, the error is surfaced in the UI.

In some embodiments, indices may not be suggested (e.g., by Performance Advisor) for operations that use a column store index. Some embodiments may provide support for recommending column store indices to be created or dropped.

In some embodiments, a profiler should correctly parse results like any other reported query for any slow queries reported that use a column store index.

Some embodiments may include explicit support for new options in any driver that requires it (e.g., a node driver). In some embodiments, mongosync/mongodump/mongorestore may include support for column store indices.

In some embodiments, Compass may include support for column store indices. For example, column store index support for the createIndex flow & screen within the Compass UI.

In some embodiments, parsing changes may be needed due to slight differences in syntax proposed herein. In some embodiments, the ability to index the entire collection as "column store" should be allowed within the createIndex UI. For example, "column store projection" may be a selectable option and may behave similar to a "Wildcard projection" option.

Some embodiments may support column store index for the index screen to label/tag column store indices as "column store" per their "type" association.

In some embodiments, logic/mapping may be used in the index mapping in Compass, for example, to define a "column store" index type given its listIndexes( ) output and associated key.

FIG. 3 shows an exemplary row store and column store formats, according to some embodiments. In some embodiments, original documents are shredded into triplets <field, docId, value> and stored in a table (e.g., WildTiger table). For efficiency, small arrays and objects are stored in the index like scalars. The inventors have recognized and appreciated that, while the compression rate is not as high as with contiguous blocks of values in traditional column stores, substantial reductions can be achieved by using WildTiger features. For example, prefix compression may be applied to keys and dictionary/prefix compression may be applied to values, which decreases the size of data loaded into the cache. In some embodiments, the on-disk storage is reduced by page compression. In exemplary schema like in FIG. 3, this most leaf pages have data for a single field for a range of RowIds.

The inventors have recognized and appreciated that column store format will naturally benefit from tiered-storage, off-loading infrequently used pages to the cloud object storage.

The inventors have recognized and appreciated that the flexible columnar format allows for a precise representation of a document collection and technically could be used as primary storage (column store collections). The inventors have recognized and appreciated that for the following reasons, this format can be used in the form of a secondary structure, namely a column store index.

For example, reconstructing nested fields, arrays, and objects (entire documents, in particular), would be very slow and would require opening a large number of cursors (e.g., WildTiger cursors); it is much faster to fetch them from the base collection.

As another example, an index can target a subset of the schema that is intended for analytical scenarios; this can be specified in a similar way to wildcard indices.

As a further example, an index can be created for any existing document collection and seamlessly enable analytical scenarios. Mixed workloads can be supported, as the optimizer will choose an appropriate access path (e.g., base collection, regular indices, column store index, materialized views, or their combination).

Some embodiments may validate a column store index is consistent with the base collection, and for repairing the index if it is out of sync. In some embodiments, this is a two-step algorithm, where the first step uses hashing to determine if there is an inconsistency; if there is, the second step walks the index and the collection, and determines which parts of the index are invalid.

Since column store indices are strongly consistent with the document collection, the inventors have recognized and appreciated that their expensive maintenance decreases the write throughput of the overall system. As a result, the inventors have recognized and appreciated that column store indices can provide fast transactional and analytical queries and can tolerate lower write performance and an additional storage cost.

The inventors have recognized and appreciated that excellent performance of column stores mostly comes from input/output savings (e.g., 70 times improvement or more on several queries). For example, a query referencing a set of fields may require loading only the relevant data, and each page commonly stores a range of documents for a single field, which allows for a much better cache utilization (e.g., in WildTiger) when processing an analytical workload.

For covering index scan (analytics): db.products.aggregate([{$group:{_id:"$type", s:{$sum:"$regularPrice"}}}]), only data for type and regularPrice needs to be loaded.

For index seek (search): db.products.aggregate([{$match: {type:'groceries'}}]).

Some embodiments retrieve type from the column store index, scan each value, evaluate the predicate and, for satisfying values, fetch a matching document based on docId from the base collection, which is analogous to scanning a B-Tree index on type and can be used for any predicate on a field included in a column store index. The inventors have recognized and appreciated that regular indices can be used to seek for equality and range predicates and deliver much better performance for selective predicates. Since they need to be tailored to the workload and one cannot create too many, the inventors have recognized and appreciated that a wildcard index can be a good alternative.

The inventors have recognized and appreciated that processing data stored in our flexible columnar storage naturally fits into the computational model of the slot-based execution. For example, each field referenced in a query can be scanned with a separate cursor and assigned to a slot. In some embodiments, an efficient prefix scan reads triplets of the 'hot' format or blocks of values of the 'cold' format; the slots are aligned based on docIds, which can be treated as a positional join; large non-scalar values are fetched from the base collection.

The inventors have recognized and appreciated that substantial performance gains can be achieved by applying further state-of-the-art processing techniques. Furthermore, on-going improvements to the Common Query Framework will naturally apply to columnar processing. In some embodiments, many analytical queries will become faster due to $group and $lookup running in Slot-based Execution. For example, a more capable query optimizer will be able to leverage columnar and document storage in mixed scenarios.

The inventors have recognized and appreciated that, similar to column-based ADL storage and time-series collections, inserts to a column store index require shredding incoming documents to individual values; but they are more expensive because a triplet for each field is inserted independently to a table (e.g., WildTiger table). The inventors have recognized and appreciated this issue is alleviated because a fairly stable number of "hot pages" (usually one per field) is expected regardless of the size of the table, and this number can fluctuate with the set of inserted schemas.

The inventors have recognized and appreciated that deletes require identifying the documents to be deleted based on a predicate, shredding them into to-be-deleted triplets and performing a lot of random input/output in the B-Tree; they often target old data, therefore, are expected to be slow.

The inventors have recognized and appreciated that updates need to be handled in place, which is pretty efficient when only selected fields are modified as one needs to access much fewer pages associated with these fields but slow for replacement-style updates.

Figure 4:
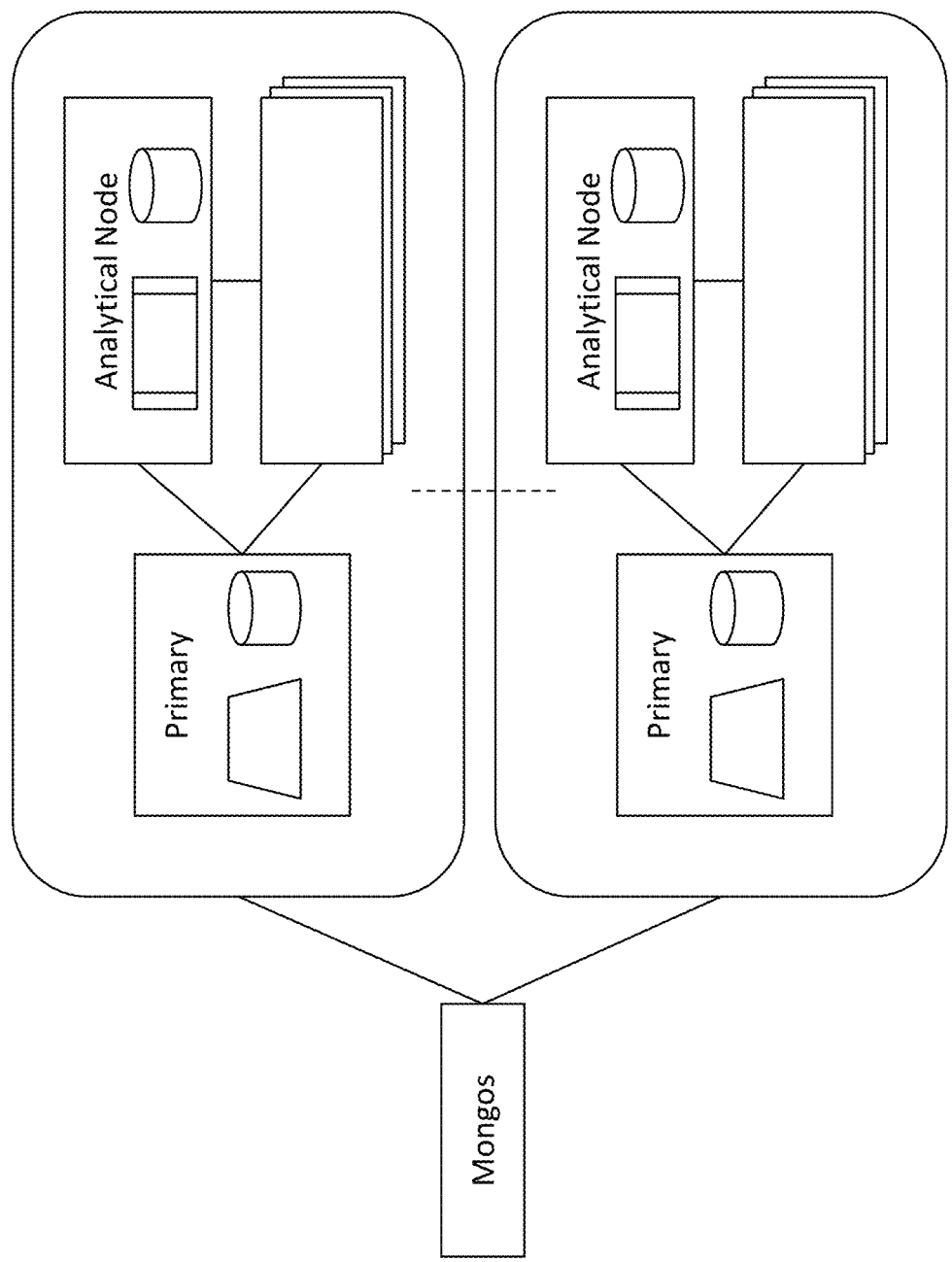
FIG. 4 is a block diagram of exemplary deployment on analytical nodes, according to some embodiments.

FIG. 4 shows exemplary deployment on analytical nodes, according to some embodiments. The inventors have recognized and appreciated that an advantage of column store indices is the ease of applying them to an existing collection. For example, a user can create an index and choose the entire schema or its subset to be indexed; the resulting column store index may be created on the primary and replicated to the secondaries.

The inventors have recognized and appreciated that while this approach is straightforward and gives high-availability for the entire mixed workload, there are several reasons why it may be desirable for users to have an option to specify secondaries dedicated for analytics. For example, that way operational and analytical workloads can be physically separated. In some embodiments, routing can happen automatically on mongos based on the character of a query. In some embodiments, analytical nodes can use resources differently, e.g., use longer query compilation to find better plans, apply aggressive intra-query parallelism, keep a longer durable history for or a different configuration for tiered storage. As another example, some embodiments may save on storage because only operational replicas may use B-Tree indices and the analytical ones—column store indices. As a further example, analytical nodes can use dedicated high-performance hardware (mostly in terms of RAM, CPUs) to tune them to the characteristics of the workload and keep up with the writes.

The inventors have recognized and appreciated that this approach may require asymmetric replicas, which may be marked as non-voting members with unconstrained indices and queries may be directed to them based on tags. In some embodiments, preliminary query analysis may allow for automatic query routing.

Figure 5:
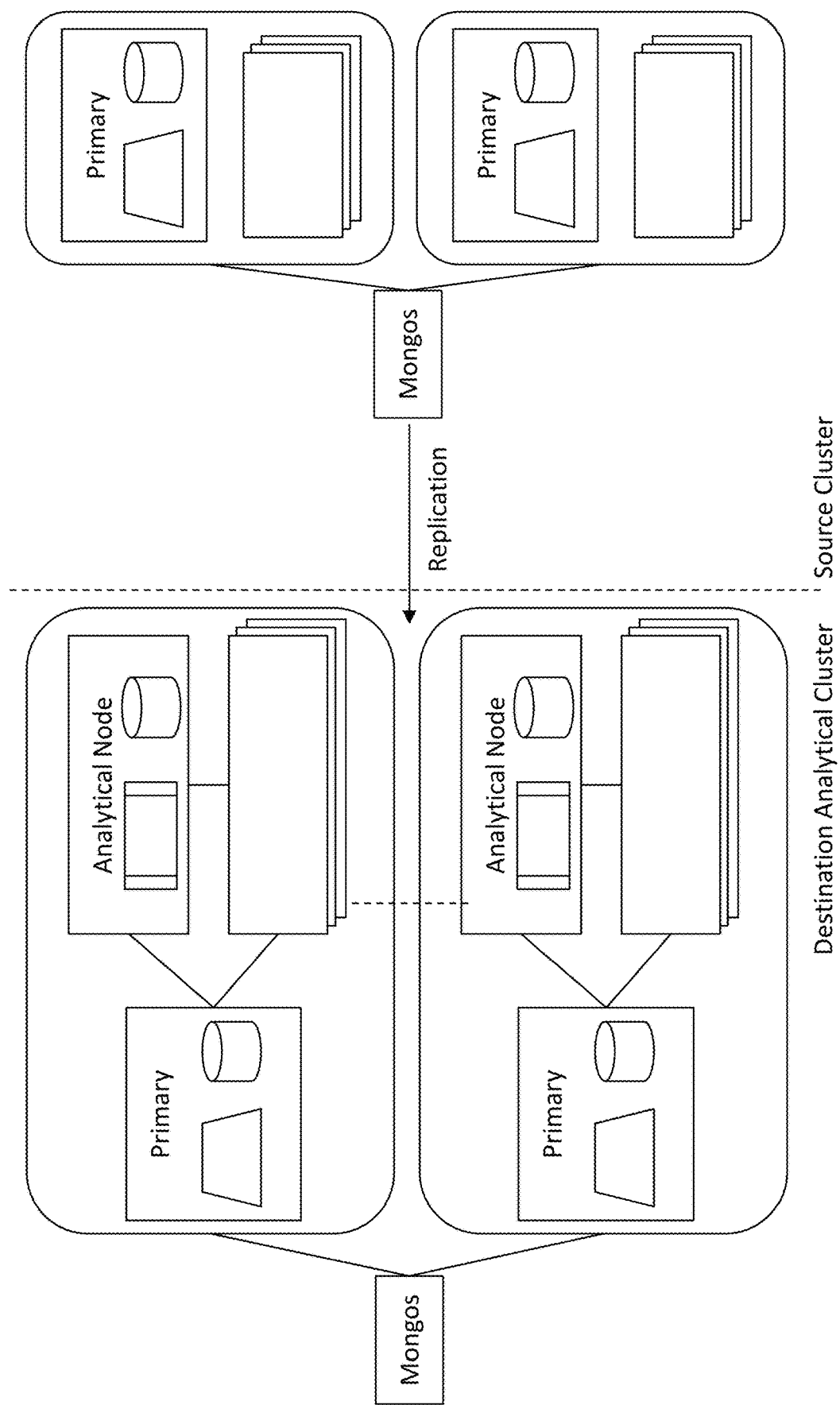
FIG. 5 is a block diagram of exemplary deployment on tailed analytical clusters, according to some embodiments.

FIG. 5 shows exemplary deployment on tailed analytical clusters, according to some embodiments. The inventors have recognized and appreciated that high-end solution is to set up a separate analytical cluster tailing the operational one, with benefits as follows:

No need to replicate collections not used for analytics (collection-level filtering);

Separate sharding policy, more shards than in the operational system may help scaling writes and help parallelize reads;

Separate high availability: In many organizations BI systems are treated as mission critical, and unavailability of analytical nodes would be unacceptable;

Separate virtual network (in particular, transactional and analytical workload are not competing over bandwidth); and/or Source data can be transformed during syncing (e.g., filtered or projected).

The inventors have recognized and appreciated that a cluster with the same shard key and high availability as the operational cluster does not necessarily require more compute and storage resources than just adding asymmetrical analytical nodes to the operational cluster.

Some embodiments may use light-weight compression algorithms, such as dictionary, RLE, bit, delta, frame of reference (FoR), or affine compression. In some embodiments, any of these may be used for time-series collections.

By design, WildTiger is agnostic of the values it stores. As a consequence, some embodiments take advantage of dictionary and prefix compression of values but cannot use type-dependent techniques, such as delta, FoR, or affine.

One possible approach involves providing an external type-aware compressor that could be applied in some embodiments (e.g., by WildTiger).

In some embodiments, A different route stays true to the current separation of concerns where WildTiger stays unaware of what it stores and further compression is implemented in the higher layers, similar to time-series collections. Instead of having a single format, some embodiments could apply a hybrid columnar approach. In some embodiments, incoming hot documents are initially stored in a way that enables faster data manipulation but may not allow for high compression. In some embodiments, over time, data cools down and is transformed by a background compaction process to a compressed format matching modern fixed-schema column stores. In some embodiments, each 'cold' entry stores a range of adjacent values of a given field in a contiguous block. For example, the following pairs <field, <docId_1,docId_n>, <value_1,value_n>> get inserted to a table (e.g., WildTiger table); this way one may reuse the compression algorithms from a time-series collection implementation.

In some embodiments, aging of a "hot" format can be done either by time-stamping with the last update-time or by converting everything that is older than 24 hours. If a cold format entry needs to be modified, it may get partially uncompressed to the 'hot' format in some embodiments.

The inventors have recognized and appreciated that certain compression formats allow for more efficient data processing. For example, {$match: {a: {$eq:2}}, where a is RLE-compressed, for each run, one may need to evaluate this predicate only once. As another example, {$group: {_id: "$b"}}, where b is dictionary-compressed; often, grouping can be more efficiently done on dictionary tokens rather than on the original values.

The inventors have recognized and appreciated that, in order to take advantage of such optimizations, decompression needs to happen during query processing rather than in the storage engine. For example, the 'cold' format presented above is one approach. In some embodiments, similar optimizations may be applied during bucket sorting/unpacking for time-series collections.

In some embodiments, SIMD instructions in modern CPUs can be employed to simultaneously perform the same operation on a vector of values, e.g., {$eq: [a,5]} or {$add: [a,1]}. For example, to adopt this model of execution, Slot-based Execution may need to start operating on blocks of values, and most common stages/expressions may need to be extended to utilize SIMD instructions, in some embodiments. If a given stage/expression cannot apply such instructions, some embodiments iterate over the elements of the block.

In some embodiments, maintaining minimum and maximum for ranges of values of a given field allows for implementing skip-scans. For example, row groups in Parquet files in ADL use such values.

In some embodiments, a separate auxiliary collection may be maintained to introduce segmentation and store various metadata about each range. Alternatively or additionally, a hybrid format may be used to treat each cold format entry as a segment.

In some embodiments, all referenced columns need to be fully scanned to answer a query. In some embodiments, parallel scans may be used to reduce query latency. In some embodiments, a new optimizer and/or the Slot-based Execution can be for these scans.

The inventors have recognized and appreciated that synchronous deletes are slow because they require a lot of random input/output to delete corresponding triplets from a B-Tree, often from cold pages. The inventors have recognized and appreciated that instead, one can mark the documents in a special docId field. In some embodiments, such documents will be omitted at query time, while the deletion process can later be completed in the background. In some embodiments, deletion and conversion to a cold format with the same process may be performed. Alternatively or additionally, some embodiments may combine them with compaction, such as may be used with LSM-Trees.

Some embodiments may encode documents in the exemplary columnar format below.

Example Collection:
- RID 998: {a: 1, b: "foo"}
- RID 999: {a: {x: 1, y: 2}}
- RID 1000: {a: 10, b: "bar"}
- RID 1998: {a: {x:1, y:2}, b: "foo"}
- RID 1999: {a: {x: 10, y: 200}}
- RID 2000: {a: {x:100, y:200}, b: "bar"}

Column Store Index Keys Stored in ONE B-Tree Index:
- <"a", 998, 1>
- <"a", 999, <large object marker>>//pointer to rowstore to save space/deduplication
- <"a", 1000, 10>
- <"a", 1998, <large object marker>>
- <"a", 1999, <large object marker>>
- <"a", 2000, <large object marker>>
- <"a.x", 999, 1>
- <"a.x", 1998, 1>
- <"a.x", 1999, 10>
- <"a.x", 2000, 100>
- <"a.y", 999, 2>
- <"a.y", 1998, 2>
- <"a.y", 1999, 200>
- <"a.y", 2000, 200>
- <"b", 998, "foo">
- <"b", 1000, "bar">

In some embodiments, users may be able to create a columnar index on any non-time series collection, including capped collections (e.g., db.example.createIndex({"$**": "column store"})). Creating the index in some embodiments will be transparent to clients. In some embodiments, the index creation may be noticeable to clients in query plans (log messages, explain output, etc.) and/or in performance.

In some embodiments, the index will be a B-Tree index. In some embodiments, it will not utilize WiredTiger's support for columnar encoding, or any more specialized custom format. Instead, in some embodiments particular sets of keys and values are generated to utilize a B-Tree index to a similar effect. In some embodiments, the index will have "sections" for each path, but only in concept. In some embodiments, the index will appear normal to the storage engine. Some embodiments will use a design similar to wildcard indices. In some embodiments, these different sections can be scanned and merged by the query system to only look at the data relevant to the query.

In some embodiments, the value proposition of this index is to reduce the input/output time to load required data. By using this index, one can often avoid fetching the entire BSON document and instead scan only the values and fields a query concerns. In some embodiments, this will end up scanning less data and can result in significant performance gains. The inventors have recognized and appreciated that gains are most noticeable when the workload was previously input/output bound, whereas if the data being queried is all hot and in-memory, this index may still improve things, but to a lesser extent.

In some embodiments, building and maintaining such an index may be cheaper to maintain than a wildcard index, but more expensive than a traditional index simply given the number of keys involved. In some embodiments, indexing a document will amount to a walk of the whole document, then inserting one key per path, including internal nodes.

In some embodiments, a column store index may be used in a limited range of queries. Alternatively, a column store index may be used for a wide range of queries. Some embodiments avoid a case where adding a column store index causes a performance regression for read operations.

In some embodiments, a column store index will be eligible to use for queries. In some embodiments, the queries may use Slot Based Execution and/or may project a limited number of fields.

In some embodiments, a non-column store index may be used for filtering/sorting and the column index to select remaining columns (e.g., as a replacement for FETCH).

In some embodiments, use of the column store index will amount to opening approximately one cursor per path needed by the query, and merging them together. Because the different sections are all sorted by RowID, it will be similar to a sorted index intersection plan.

The inventors have recognized and appreciated ways in which a user might interact with some embodiments. For example, if the {"$**": "column store"} index is the only index on the collection, the index may be used for a query like: db.example.find({a:2}, {_id:0, a:1}). This can be verified using explain, where you may see a 'COLUMN_SCAN' stage in the output. Some embodiments support 'executionStats' where one can detail how many times each section of the index was scanned.

In some embodiments, a columnar index can be avoided (possible to use but not used to avoid hurting performance). In some embodiments, a user can provide a hint to use the columnar index, for example: db.example.find({ }, {f0: 1, f1: 1, f2: 1, f3: 1, f4: 1}).hint({"$**": "column store"}). In some embodiments, a hint can also be used to select the column store index instead of an existing index.

In some embodiments, filters on the columns may sometimes be eligible to be applied during the scan of the index. For example, something as simple as equality can be applied while scanning a column. Another example is an {Sexists: true} predicate, which is implied by scanning any particular top-level column, since the index is sparse. In some embodiments, it is not true when scanning a nested column like "a.b" for an example like {a:[[{b: 1}]]} where the index will contain an entry but it does not match {"a.b": {Sexists: true}}, since match expressions do not traverse arrays which are directly nested inside other arrays.

In cases where a query can only partially be pushed into the index scan, some embodiments support splitting the filter in pieces.

Some embodiments may have downstream visible behavioral changes. For example, in some embodiments, a new type of index will be available to create.

In some embodiments, new server parameters may be used.

To index a document in the column store index, some embodiments "shred" it into its parts and insert one cell per path in the document. In some embodiments, a cell is a key/value pair where the key is Dotted.Path\0RowId and the value is the value (or values) at that path. For example, a document like {name: {first: "Al", last: "Gore"}, . . . } with a RowID of RID may generate index keys for name.first\0RID and name.last\0RID, among others. In some embodiments, all keys go into the same index, much like a wildcard index which stores a compound index key (path, value), whereas a columnar index does not put the value(s) in the key in some embodiments.

"RowID" terminology is used instead of RecordId because when supporting collections clustered by an arbitrary key, some embodiments do not store the record ID directly in the index, but instead store a generated "row ID" that can be mapped back to the RecordId. In some embodiments, RowID and RecordID are the same thing.

In some embodiments, there is no cross-value compression (e.g., in the MongoDB layer). The inventors have recognized inter-row compression generally as a superset of intra-row because if that is handled sufficiently, there is no need to do anything special for intra-row. In some embodiments, only the storage engine is able to do inter-row compression because only it knows the page boundaries (and doing it at that layer avoids issues with transactions). In some embodiments, a few kinds of inter-row value compression are done: Dictionary Compression and Block Compression.

Some embodiments enable dictionary compression (e.g., in WildTiger) for the values in the column store B-Tree. The inventors recognized and appreciated this can improve both on-disk and in-cache size, meaning that roughly each unique value within a page (e.g., WildTiger page) will be stored only once, rather than each time it appears. In some embodiments, this only applies to values larger than ~3 bytes, otherwise there is no savings from using the dictionary reference; also, this considers the entire value, so for example, there will be no reduction for [1, 2, 3, 4] and [1, 2, 3, 5], but if you added another [1, 2, 3, 4], it would refer to the other entry rather than duplicating it. Some embodiments perform inter-row compression. Alternatively, the dictionary can be applied to the individual values within the cell, in addition to the entire cells.

Some embodiments use block compression, which may apply a compression algorithm (e.g., snappy or zstd) to a full page image (e.g., WildTiger), which may reduce storage size and input/output bandwidth, but not in-memory cache consumption in some embodiments. The inventors recognized and appreciated this can work well for both inter- and intra-row values, especially with repetition of at least 4 bytes. The inventors recognized and appreciated this is worthwhile if only to reduce cache pressure and result in less data passing through the compressor/decompressor.

In some embodiments, the query planner may generate plans using the column index in various situations: in some embodiments, when Slot-based Execution can be used; in some embodiments, when the query needs only a limited number of fields; in some embodiments, when the index does not have a column storeProjection, or the query needs a subset of those fields; in some embodiments, when there are no alternative indexed query plans according to the usual index eligibility rules.

In some embodiments, the query planner may push pieces of a top-level and into the column scan operator. In some embodiments, these filters can be applied per-column using an algorithm, which dynamically selects the most selective branch of the "AND" to evaluate first.

In some embodiments, a "limited number of fields" may be defined in one of two ways:

(1) If there are no filters which can be pushed down, the system may use internalQueryMaxNumberOfFieldsToChooseUnfilteredColumnScan (default 5) as a cap on the number of fields used.

(2) If there is at least one constraint on at least one scanned column, the system may use internalQueryMaxNumberOfFieldsToChooseFilteredColumnScan (default 12) as a cap.

In some embodiments, a hint can be used to force the use of a columnar index. In some embodiments, a hint will cause the planner to ignore other indices and also ignore the above constraints on the number of fields referenced. In some embodiments, a hint will allow the index to be used without any projection at all, which the user may deem worthwhile if the filters are selective enough. In some embodiments, when hinted, the only way one would not get a plan with the column store index would be if (a) Slot-based Execution is disabled, (b) a column storeProjection disqualifies the query, or (c) the execution code falls back to a row store scan at runtime. In some embodiments, any of these conditions may prevent column store from functioning and may result in an error being returned to the application. Alternatively, column store may be modified (e.g., include a FETCH stage afterwards if there is no projection), but COLUMN_SCAN may always be usable.

In some embodiments, filter splitting may be used. The inventors recognized and appreciated that the query predicate can be considered to extract predicates that can be applied while scanning, leaving the rest to be applied after "assembling" the various columns together. For example:

```
db.example.find(
    {name: "Charlie", negative_reviews: {$exists: false}},
    {positive_reviews: 1});
```

Some embodiments can apply the {name: {$eq: "Charlie"}} filter while scanning the "name" portion of the index, and then apply the {negative_reviews: {$exists: false}} predicate after assembling the document, since it will need more information than just what is in the negative_reviews column to answer. For example, the combination of both the negative_reviews and a "dense" column may be used like the pseudo or _id column. For further example, "assembling the document" may be four pieces: _id, name, negative_reviews, positive_reviews and after applying the remaining {negative_reviews: {$exists: false}} filter, the name and negative_reviews may be projected out.

Some embodiments use a new ColumnScan QuerySolutionNode, representing a read from a fixed set of columns. For example, a query may be:

```
db.reviews.aggregate([
    {$match: {product.type: "TV"}},
    {$group: {
    _id: "$product.id",
    rating: {$avg: "$stars"}}},
    {$match: {rating: {$gt: 3}}
])
```

Figure 6:
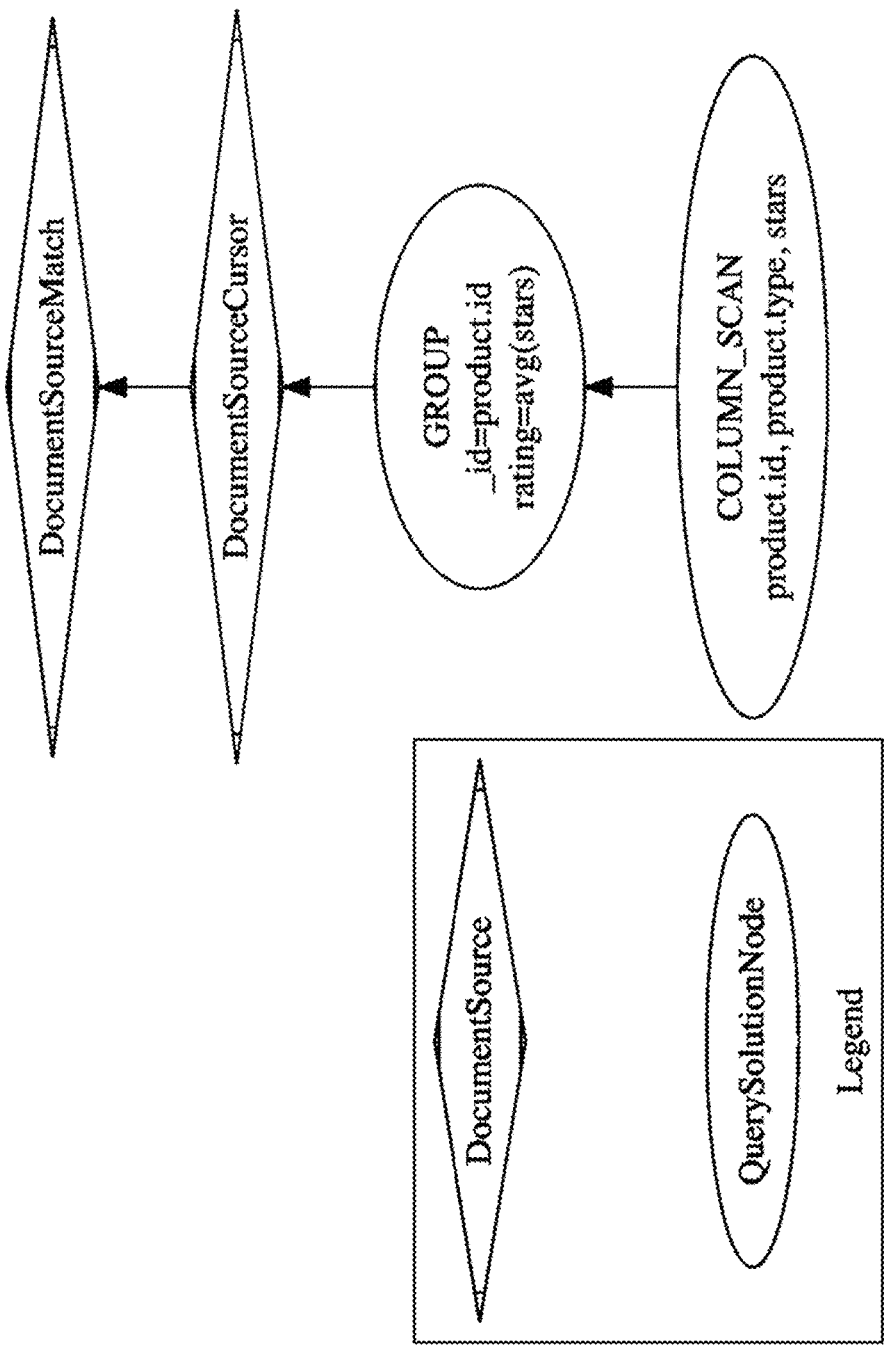
FIG. 6 is a flowchart of an exemplary query plan tree, according to some embodiments.

FIG. 6 shows an exemplary query plan tree, according to some embodiments, the query plan tree would end up looking like the following.

In some embodiments, a Slot-based Execution column-scan stage may be used, which is responsible for reading from the columns used, as well as their parent paths (when necessary). In some embodiments, this stage may have a similar interface to the scan stage.

Some embodiments apply "AND" filters per column. For example, queries with a top-level "AND" may sometimes use a special algorithm to evaluate branches of the "AND"

at the column-level. For queries with "ORs," or otherwise complex filters, this algorithm may not be used in some embodiments. Some embodiments support a "partial pushdown," for predicates which are complex, but some branches can be pushed into a column scan.

In some embodiments, N cursors are given over individual columns, some of which have filters, and the filter may be applied at the column level. In some embodiments, this is because each column is ordered by RID, and each branch of the "AND" only passes when a value exists.

In some embodiments, the column store index may be used only when the storage size of the collection is larger than available physical memory. The inventors have recognized and appreciated that column scan generally beats collection scans even when the collection and documents are small, if the number of filters that get pushed down is large. The inventors have recognized and appreciated that this should be considered in plan selection heuristics, as well as combining the document size and collection size heuristics in a more intelligent way. In some embodiments, a heuristic may be to use a column scan only if: the collection is larger than RAM, or the collection is smaller than RAM and (a) the docs are large or (b) a large number of filters (at least 2 or 3) can be pushed down. This may enable choosing column scan for the charts workload running on a low-memory instance, and it may activate it for some appropriate queries on the regular instances.

In some embodiments, collation will not have a meaningful impact on use of the column store index. In some embodiments, collation will not affect any comparisons with key names, so any scan of the column store index will remain the same. When looking at the values in the index, some embodiments may apply a collation. This is not uncommon in other query plans (e.g., applying a filter with a collation after a fetch or in a late $match stage in an aggregate pipeline). In some embodiments, there will be no special handling or heuristics for changing when to use the index in face of a collation.

In some embodiments, views will not have any material interaction with column store indices. In some embodiments, a view may alter a query in such a way that it cannot use the index, but the effects will be as if the user typed the entire expanded aggregation pipeline themselves.

In some embodiments, the query planner may include all fields of a shard key in the set of columns requested, and to apply a SHARD_FILTER stage on top of the COLUMN_SCAN node. Aside from this, current interactions between the sharding and query subsystems do not involve indices.

In order to make sure that the storage size does not blow up, in some embodiments all columns representing "real fields" will continue to use a 64 bit row ID. In some embodiments, this row ID will then be mapped to the cluster key via a special column.

In some embodiments, a columnar index may store for any given field path a result of projection at that path. In some embodiments, a columnar index may include a materialized view of all possible paths. For example: for a path "a" the system may store result of {"a":1} projection; for a path "a.b" the system may store result of {"a.b":1} projection; for a path "a.b.c" the system may store result of {"a.b.c":1} projection.

In some embodiments, B SON may be used to store documents, even as-is.

In some embodiments, the index keys include 8 bytes for the RowID, which may be unnecessary in many cases. In some embodiments, the RowID is part of the index key and is stored in a big endian format.

In some embodiments, above designs may attempt to store extra information in order to correctly reconstruct the overall shape of the document. In some embodiments, the shape of the document may not be fully reconstructed.

Some embodiments may "unpack" the document after the columnar delivers it, which may be true for $match, $group, $lookup, and perhaps others.

Some embodiments may fix the cases where there is a need to go to the row store to fetch non-leaf values. The inventors have recognized and appreciated that this fits in the overall design philosophy of Slot-based Execution to deliver values (slots) and avoid redundant object creation (e.g., mkobj), which can be a performance hit.

In some embodiments, the complexity of array encoding may be avoided. For example, the simplicity here is appealing because it makes the approach easier to reason about, and has a better overall chance of capturing semantics correctly. In some embodiments, there may be a necessity to go to row store if there is an unfavorable combination of array and sub-object nesting, or the need to examine more than one column store entry (e.g., parent path).

The inventors recognized and appreciated that there are some cases where this scheme would not be able to distinguish between two cases that are required to be different for semantics, match or otherwise (e.g., {a: [{b: [5]}]} and {a: {b: [[5]]}}). For both of these, "$a.b" results in the same thing: [[5]]. However, since $match does not traverse through doubly-nested arrays, some match expressions will behave differently between the two in some embodiments.

Examples of valid objects include {a: {b: {c: "const"}}}, {a: [{b: {c: "const"}}]}, {a: {b: {c: ["const"]}}}, and {a: [{b: [{c: ["const"]}]}]} (each with path "a.b.c"), with respective values stored in columnar index of "const", ["const"], ["const"], [[["const"]]].

Examples of invalid objects include {a: [{b: [{c: "const"}]}]} and {a: [[{b: {c: "const"}}]]}.

The inventors recognized and appreciated that, if objects like those listed in "invalid objects" are eliminated from consideration, then queries and field path expressions like "$a.b.c" can be answered without any ambiguity. For example, the query {"a.b.c": "const"} would match any entry which has at least one "const" in the "a.b.c" list of values; a group-by of "$a.b.c" could directly use the value in the index.

In some embodiments, the proposal is to keep track of paths supported by the column store in a way similar to regular indices. In this case the paths are explicitly specified when the column store is created (for example: create column_index("a", "a.b", "a.c", "b")). The inventors have recognized and appreciated that this approach may provide further simplification by eliminating the need to go to parent paths; the list of fields of interest about could be used to explicitly mark and store something in the index for values which do not have the field. In essence this becomes a straightforward materialized view.

The inventors recognized and appreciated that array information has much complexity, and it may be necessary to store structural information separated from the values. Accordingly, some embodiments may store "slices" of actual documents, either as BSON or with another recursively defined format. The inventors recognized and appreciated the importance of encoding enough information to correctly reconstruct complex arrays.

The inventors recognized and appreciated that, due to the sparse nature of the columnar index in some embodiments, it is not always possible to efficiently provide existing MQL semantics (e.g., of $project). For example, this problem may apply to projection and access of fields (both $project and find( ) projection). In some embodiments, projection may mean anything that is not filtering, and may include $group, $sort, expression/accumulator computation, etc.; $match/filtering may not have semantics that clash with the way the column store is designed.

The inventors recognized and appreciated that there are also cases where the a.b column is aware of some value for the document, but, due to an array along the path with an adjacent object, there is not enough information in the column to preserve the $project semantics.

For example:

: 5

Original Document: {a: [null, {b: 1}, {c:1}]}

Expected Result of {$project: {"a.b": 1}}: {a: [{b:1}, { }]}

Expected result of "$a.b": [1]

In this example, the a.b column is aware of the 'b:1' value, but it is not aware of the adjacent object {c:1}; the empty object in the output at a[1] cannot be recovered using the a.b column.

In some embodiments, evaluating a field path expression (e.g., "$a.b") may also require "knowledge" about the document's structure, even if a.b does not exist. For example, none of documents 1, 2, and 4 have a value at a.b, but the result of "$a.b" differs for document 4, when there is an array.

| # | Original Document | Expected result of "$a.b" |
|---|---|---|
| 1 | {a:"foo"} | missing |
| 2 | {a: {c: 1, d:1}} | missing |
| 3 | {a: {b:1, c:1}} | 1 |
| 4 | {a: [null, { }, {c: 1}]} | [ ] |

In some embodiments, the IS_SPARSE flag and the "o" marker in arrInfo may be used to solve one or more of the above situations.

Some embodiments can detect whether each path exists at every parent path in a given document. In some embodiments, paths where this is the case are "locally dense." In the cases where a path is locally dense, all of the above problems with MQL semantics are avoided, and the column index can be used without a fetch. In some embodiments, cells which are not "locally dense" will be tagged with a special marker: IS_SPARSE. The inventors have recognized and appreciated that the cost of parsing array information can be avoided in certain cases due to MQL's double array semantics.

In order to enable dynamic fetching on a per-cell basis, some embodiments build a query execution tree with one "super" stage, which does all the handling of assembling documents and possibly fetching from the row store. In some embodiments, this means that from an access plan perspective, a fetch-iscan plan may be built, but the runtime part of whether to do the fetch may be dynamic.

Some embodiments store a special marker (e.g., "o" is used herein) in the arrayInfo for any path which was an array and skipped over an element of the array which was an object. Some embodiments may use these to efficiently reconstruct the correct structure for a dotted path by looking up at its parent paths to find the first non-sparse parent; from there the arrayInfo may be used to reconstruct the right structure and add the child values in the correct places.

In some embodiments, queries on columns which always (or nearly always) appear will still perform well. For columns of dotted paths which are sometimes missing, some embodiments may scan the parent columns to find the correct answer.

Figure 7A:
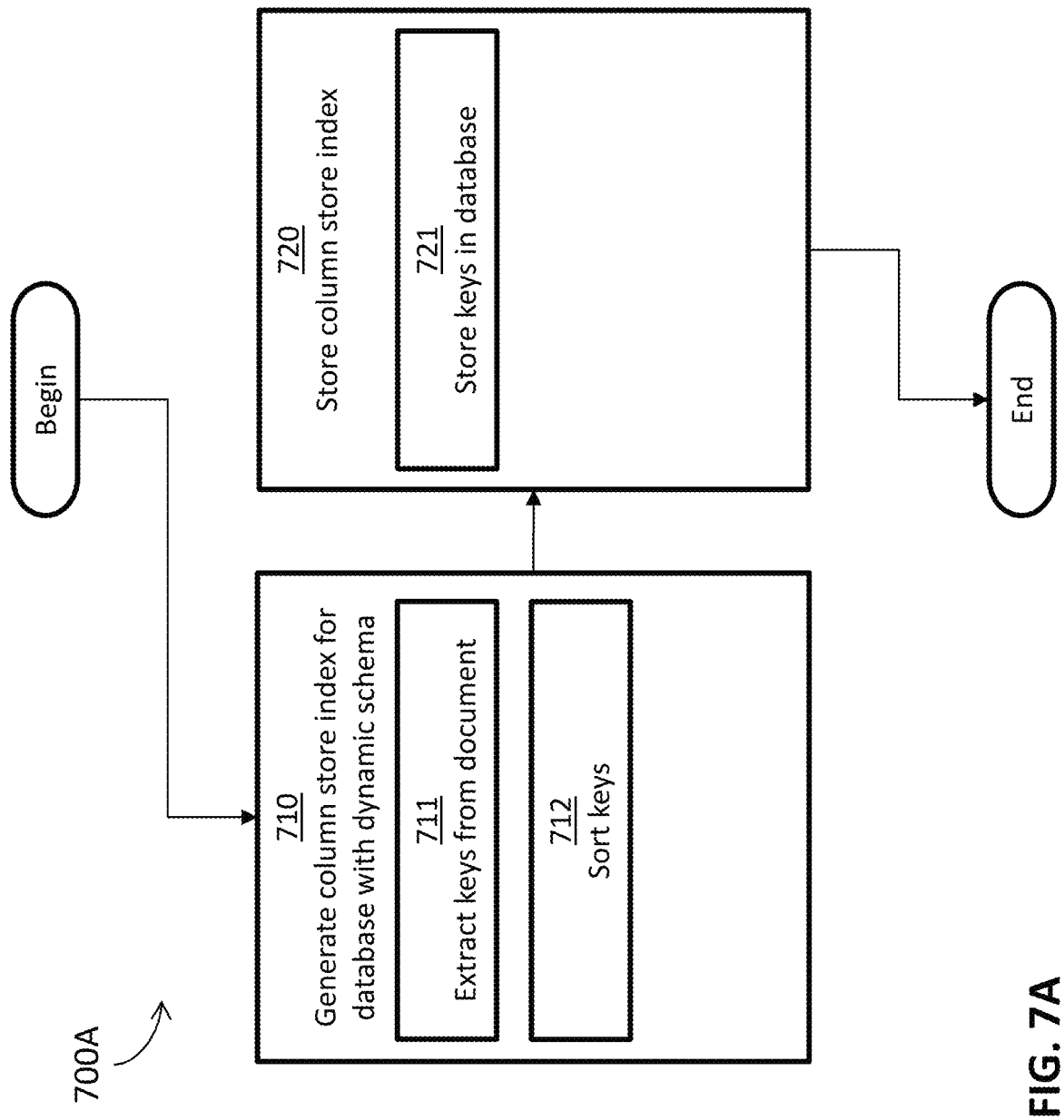
FIG. 7A is a flowchart showing an example method for performing column store operations for a database, according to some embodiments.

As discussed above, various systems may be configured to perform column store operations discussed herein. FIG. 7A shows an example process 700A according to some embodiments. Process 700A may be performed by a system (e.g., that shown in FIG. 1) to perform column store operations for a database, such as a database employing a dynamic schema and/or an eventual consistency model. In some embodiments, process 700A may include an act 710 of generating a column store index for a database with a dynamic schema, which may be performed by a processor. In some embodiments, act 710 may include an act 711 of extracting keys from a document (e.g., one or more documents in the database). In some embodiments, act 710 may include an act 712 of sorting the keys.

In some embodiments, process 700A may further include an act 720 of storing the column store index, which may be performed by a processor, which may be the same as or separate and distinct from the first processor. In some embodiments, act 720 may include an act 721 of storing the keys (e.g., in the database). Process 700A may then end or repeat as necessary.

In some embodiments, the acts 710 and/or 720 may be performed by a client device and/or a server. Dividing the process 700A between multiple devices may advantageously reduce the total amount of time required to perform the process 700A by reducing the communication between the client device and the server.

Figure 7B:
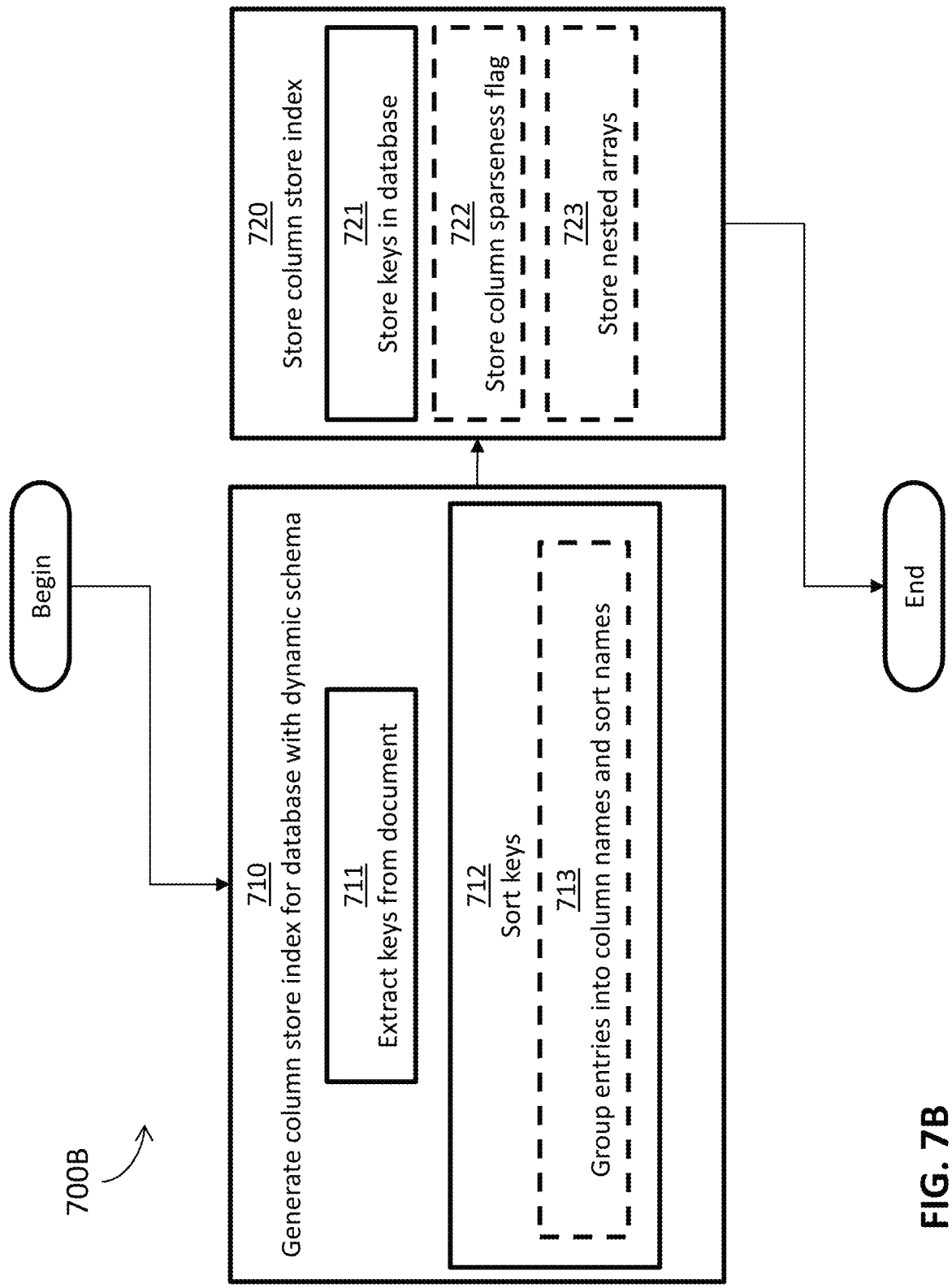
FIG. 7B is a flowchart showing an additional example method for performing column store operations for a database, according to some embodiments.

FIG. 7B shows an example process 700B according to some embodiments. Process 700B may be performed by a system (e.g., that shown in FIG. 1) to perform column store operations for a database, such as a database employing a dynamic schema and/or an eventual consistency model. In some embodiments, process 700B may include an act 710, similar to that described above. In some embodiments, process 700B may further include an act 720 similar to that described above. In some embodiments, act 710 may include an act 711 similar to that described above. In some embodiments, act 710 may include an act 712 similar to that described above. In some embodiments, act 720 may include an act 721 similar to that described above.

In some embodiments, act 712 may include an act 713 of grouping entries into column names and sorting the column names. In some embodiments, act 720 may further include an act 722 of storing a column sparseness flag (e.g., in the database). In some embodiments, act 720 may further include an act 723 of storing at least one nested array (e.g., in the database).

Process 700B may then end or repeat as necessary.

Computer System

Figure 2:
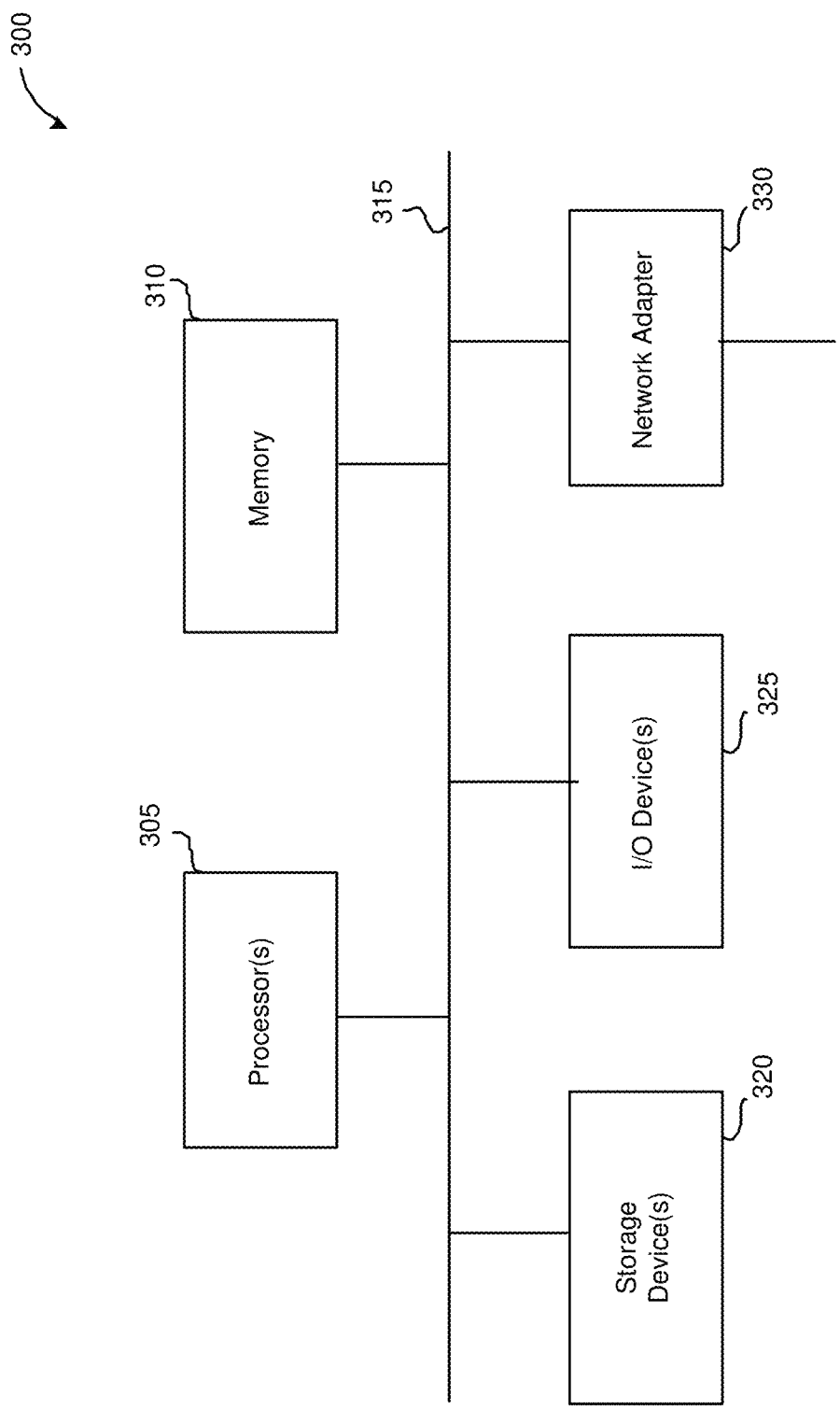
FIG. 2 is an example block diagram of a machine in the example form of a computer system within which a set of instructions for causing the machine to perform one or more of the methodologies discussed herein may be executed, according to some embodiments.

FIG. 2 is a block diagram of a computer system as may be used to implement certain features of some of the embodiments. The computer system may be a server computer, a client computer, a personal computer (PC), a user device, a tablet PC, a laptop computer, a personal digital assistant (PDA), a cellular telephone, an iPhone, an iPad, a Blackberry, a processor, a telephone, a web appliance, a network router, switch or bridge, a console, a hand-held console, a (hand-held) gaming device, a music player, any portable, mobile, hand-held device, wearable device, or any machine capable of executing a set of instructions (sequential or otherwise) that specify actions to be taken by that machine.

The computing system 300 may include one or more central processing units ("processors") 305, memory 310, input/output devices 325, e.g., keyboard and pointing devices, touch devices, display devices, storage devices 320, e.g., disk drives, and network adapters 330, e.g., network interfaces, that are connected to an interconnect 315. The interconnect 315 is illustrated as an abstraction that represents any one or more separate physical buses, point to point connections, or both connected by appropriate bridges, adapters, or controllers. The interconnect 315, therefore, may include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (12C) bus, or an Institute of Electrical and Electronics Engineers (IEEE) standard 1394 bus, also called Firewire.

The memory 310 and storage devices 320 are computer-readable storage media that may store instructions that implement at least portions of the various embodiments. In addition, the data structures and message structures may be stored or transmitted via a data transmission medium, e.g., a signal on a communications link. Various communications links may be used, e.g., the Internet, a local area network, a wide area network, or a point-to-point dial-up connection. Thus, computer readable media can include computer-readable storage media, e.g., non-transitory media, and computer-readable transmission media.

The instructions stored in memory 310 can be implemented as software and/or firmware to program the processor 305 to carry out actions described above. In some embodiments, such software or firmware may be initially provided to the processing system 300 by downloading it from a remote system through the computing system 300, e.g., via network adapter 330.

The various embodiments introduced herein can be implemented by, for example, programmable circuitry (e.g., one or more microprocessors) programmed with software and/or firmware, or entirely in special-purpose hardwired (non-programmable) circuitry, or in a combination of such forms. Special-purpose hardwired circuitry may be in the form of, for example, one or more ASICs, PLDs, FPGAs, etc.

The terms "program" or "software" are used herein in a generic sense to refer to any type of computer code or set of processor-executable instructions that can be employed to program a computer or other processor to implement various aspects of embodiments as discussed above. Additionally, it should be appreciated that according to one aspect, one or more computer programs that when executed perform methods of the disclosure provided herein need not reside on a single computer or processor, but may be distributed in a modular fashion among different computers or processors to implement various aspects of the disclosure provided herein.

Processor-executable instructions may be in many forms, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

Also, data structures may be stored in one or more non-transitory computer-readable storage media in any suitable form. For simplicity of illustration, data structures may be shown to have fields that are related through location in the data structure. Such relationships may likewise be achieved by assigning storage for the fields with locations in a non-transitory computer-readable medium that convey relationship between the fields. However, any suitable mechanism may be used to establish relationships among information in fields of a data structure, including through the use of pointers, tags or other mechanisms that establish relationships among data elements.

Also, various inventive concepts may be embodied as one or more processes, of which examples (e.g., the processes described with reference to figures and functions above, the various system components, analysis algorithms, processing algorithms, etc.) have been provided. The acts performed as part of each process may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, and/or ordinary meanings of the defined terms. As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

Use of ordinal terms such as "first," "second," "third," etc., in the claims to modify a claim element does not by itself connote any priority, precedence, or order of one claim element over another or the temporal order in which acts of a method are performed. Such terms are used merely as labels to distinguish one claim element having a certain name from another element having a same name (but for use of the ordinal term).

The phraseology and terminology used herein is for the purpose of description and should not be regarded as limiting. The use of "including," "comprising," "having," "containing," "involving," and variations thereof, is meant to encompass the items listed thereafter and additional items.

Having described several embodiments of the techniques described herein in detail, various modifications, and improvements will readily occur to those skilled in the art. Such modifications and improvements are intended to be within the spirit and scope of the disclosure. Accordingly, the foregoing description is by way of example only, and is not intended as limiting. The techniques are limited only as defined by the following claims and the equivalents thereto.

What is claimed is:

1. A database system comprising:
    an unstructured database having a dynamic schema, the unstructured database configured to store data in document data units, the document data units storing data in key/value pairs; and
    at least one processor configured to:
        generate at least one column store index associated with the unstructured database, at least by:
            extracting keys from at least one document data unit of the document data units in the unstructured database, the keys defining fields stored in the at least one document data unit, and
            sorting the keys;
        store the at least one column store index at least by storing the keys in the unstructured database, wherein the at least one column store index references document data units storing fields defined by the keys; and
        query the unstructured database using the at least one column store index to retrieve data associated with fields defined by the keys from document data units stored in the unstructured database.

2. The database system of claim 1, wherein the at least one processor is configured to store at least one flag indicating sparseness for a column in the unstructured database.

3. The database system of claim 1, wherein sorting the keys includes grouping entries for each column into column names and sorting the column names.

4. The database system of claim 1, wherein bulk inserting is used in relation to sorting the keys.

5. The database system of claim 1, wherein prefix compression is used in relation to sorting the keys.

6. The database system of claim 1, wherein the at least one processor is configured to store nested arrays.

7. The database system of claim 1, wherein the at least one processor is configured to perform at least one query on the database, wherein the at least one query is applied directly to a data stream.

8. The database system of claim 1, wherein sorting the keys is performed in-memory.

9. The database system of claim 1, wherein at least some of the document data units comprise BSON document data units.

10. A computer implemented method comprising:
    generating at least one column store index associated with an unstructured database storing data in document data units, at least by:
        extracting keys from at least one document data unit of the document data units in the unstructured database, the at least one document data unit storing data in key/value pairs in the unstructured database, the keys defining fields stored in the at least one document data unit; and
        sorting the keys; and
    storing the at least one column store index at least by storing the keys in the unstructured database, wherein the at least one column store index references document data units storing fields defined by the keys; and
    querying the unstructured database using the at least one column store index to retrieve data associated with fields defined by the keys from document data units stored in the unstructured database.

11. The method of claim 10, further comprising storing at least one flag indicating sparseness for a column in the unstructured database.

12. The method of claim 10, wherein sorting the keys includes grouping entries for each column into column names and sorting the column names.

13. The method of claim 10, wherein bulk inserting is used in relation to sorting the keys.

14. The method of claim 10, wherein prefix compression is used in relation to sorting the keys.

15. The method of claim 10, further comprising storing nested arrays.

16. The method of claim 10, further comprising performing at least one query on the database, wherein the at least one query is applied directly to a data stream.

17. The method of claim 10, wherein sorting the keys is performed in-memory.

18. At least one non-transitory computer-readable storage medium having instructions recorded thereon which, when executed by a computer, cause the computer to perform a method comprising:
    generating at least one column store index associated with an unstructured database storing data as document data units, at least by:
        extracting keys from at least one document data unit of the document data units in the unstructured database, the at least one document unit storing data in key/value pairs in the unstructured database, the keys defining fields stored in the at least one document data unit; and
        sorting the keys; and
    storing the at least one column store index at least by storing the keys in the unstructured database, wherein the at least one column store index references document data units storing fields defined by the keys; and
    querying the unstructured database using the at least one column store index to retrieve data associated with fields defined by the keys from document data units stored in the unstructured database.

19. The at least one non-transitory computer-readable storage medium of claim 18, wherein bulk inserting is used in relation to sorting the keys.

* * * * *